(12) United States Patent
Blick

(10) Patent No.: US 9,937,597 B2
(45) Date of Patent: Apr. 10, 2018

(54) VACUUM SWIVEL POST

(71) Applicant: John Blick, Laguna Beach, CA (US)

(72) Inventor: John Blick, Laguna Beach, CA (US)

( * ) Notice: Subject to any disclaimer, the term of this patent is extended or adjusted under 35 U.S.C. 154(b) by 0 days.

(21) Appl. No.: 14/997,569

(22) Filed: Jan. 17, 2016

(65) Prior Publication Data

US 2017/0203399 A1    Jul. 20, 2017

(51) Int. Cl.
*B25B 11/00* (2006.01)
*B23Q 3/08* (2006.01)
*B23Q 1/00* (2006.01)

(52) U.S. Cl.
CPC .......... *B23Q 3/088* (2013.01); *B23Q 1/0027* (2013.01); *B25B 11/007* (2013.01)

(58) Field of Classification Search
CPC ...... B23Q 3/088; B25B 11/005; B25B 11/007
See application file for complete search history.

(56) References Cited

U.S. PATENT DOCUMENTS

| | | | | |
|---|---|---|---|---|
| 1,140,720 A * | 5/1915 | Simons | .................. | B01D 35/30 210/312 |
| 2,444,531 A * | 7/1948 | Richardson | ........... | B23B 31/307 279/3 |
| 2,489,441 A * | 11/1949 | Warren | ............... | F16L 27/0828 285/179 |
| 4,437,690 A * | 3/1984 | Drath | .................. | F16L 27/0837 285/185 |
| 5,553,837 A * | 9/1996 | Kahle | .................. | B25B 11/007 269/21 |
| 5,562,276 A * | 10/1996 | Blick | ..................... | B23Q 1/032 269/20 |
| 5,803,360 A * | 9/1998 | Spitznagel | ............ | B05B 7/2402 239/345 |
| 5,839,764 A * | 11/1998 | Heidelberger | ........ | F16L 27/093 285/190 |
| 6,286,822 B1 * | 9/2001 | Blick | ........................ | B24B 9/08 269/21 |
| 6,817,933 B2 * | 11/2004 | Blick | .................... | B24B 41/068 269/21 |
| 2008/0238092 A1 * | 10/2008 | Chen | ........................ | B25C 1/04 285/190 |
| 2009/0146416 A1 * | 6/2009 | Wei | ....................... | F16L 27/093 285/34 |

* cited by examiner

*Primary Examiner* — Joseph J Hail
*Assistant Examiner* — Tyrone V Hall, Jr.
(74) *Attorney, Agent, or Firm* — Curtis L. Harrington; Harrington & Harrington

(57) ABSTRACT

A pivoting vacuum fitting support vacuum post enables fittings to be quickly manually re-oriented during set up, break down, storage, and shipping of a vacuum support or other device using the vacuum post. A segmented core pivotally supports an outer fitting pivoting support sleeve that supports a pair of segregated and independently operable vacuum ports typically to supply vacuum independently to a base of a vacuum support to hold it in place, and to an upper work piece vacuum hold down support. Incorporation of a spacer that can be supplied in varying heights enables use of the vacuum post in a variety of vacuum supports of varying height.

7 Claims, 12 Drawing Sheets

VACUUM SWIVEL POST

FIELD OF THE INVENTION

The present invention relates to improvements in the field of vacuum supports that use a vacuum to create force to hold the support in place with independent activation of lower vacuum and that stabilize a work piece onto the upper part of the support with upper vacuum, and particularly to the provision of a swiveling post through which an upper and a lower vacuum fitting may be attached while allowing the fittings to rotate about a vertical axis of the post through which upper and lower vacuum service is applied.

BACKGROUND OF THE INVENTION

As was described in U.S. Pat. No. 5,562,276, issued on Oct. 8, 1996 to the inventor of the instant application and entitled "LOCATOR AND HOLD DOWN SYSTEM FOR A MACHINE" and which is incorporated by reference herein, a vacuum hold down and location system needs to have flexibility in location and overall configuration of deployed vacuum hold down supports. Also, as was described in U.S. Pat. No. 6,286,822, issued on Sep. 11, 2001 to the inventor of the instant application and entitled "MACHINEABLE SUPPORTS FOR CLOSE TOLERANCE EDGE SUPPORT" and which is incorporated by reference herein, a vacuum hold down support ("vacuum support") for use with the vacuum hold down system was illustrated and described. The vacuum support and support system facilitates fixed horizontal support as well as lateral stabilization of a work piece which is to be processed by milling, sanding, grinding, etc. Processing is typically carried out with a router-type spindle which travels around the vacuum support stabilized and supported work piece.

The vacuum hold down supports have typically carried horizontally oriented vacuum quick-connect fittings to facilitate a more rapid layout arrangement of supports and quick connection and disconnection of vacuum lines generally horizontally distributed over the process working table. The vacuum fittings on the vacuum supports that are supported by the individual vacuum distribution post of the vacuum supports are typically outwardly disposed (with respect to the center of the vacuum support) to facilitate greatest ease of manual access. Although the outermost extent of the post supported vacuum fittings are typically inset from the lower and upper vacuum platforms to avoid lateral damage during handling, some damage to the prominently located post mounted vacuum fittings can occur if the vacuum supports are roughly handled. Rough handling can occur on setup, break down, and shipping.

Currently available vacuum supports are available in a greater variety of shapes than previously. Shapes can include, to name a few, rectangular, quadrant shaped, concave corner, round, and narrow (for supporting fragile regions). Vacuum supports can be assembled on a working table in a complex configuration. Dense, closely located configurations can likely produce a blocking interference with respect to two or more adjacently located vacuum supports. In addition, a given configuration might require placement that locates vacuum fittings in a position to require a longer route for a longer vacuum supply hose, especially due to the horizontal orientation of the fixed direction of the vacuum fittings on the vacuum supply post. Generally, the use of vacuum supply hoses of greater routing distance are generally to be avoided. Longer and more circuitous placement of vacuum supply hoses can increase the chance for operator error. A solution which enables greater simplicity and reliability is needed.

SUMMARY OF THE INVENTION

A pivoting vacuum fitting vacuum post enables vacuum fittings to be quickly manually re-oriented during set up, break down, storage, and shipping. A segmented core carries a pair of segregated vacuum transmission grooves that extend completely about the circumference of the segmented core. A first, upper, vacuum transmission groove. A second, lower, vacuum port opens into a second, lower reduced diameter land as a vacuum transmission groove. The first and second reduced diameter portions distribute vacuum around the volume circumferentially outward of the first and second reduced diameter lands.

A series of three "o" ring support groove structures are provided to isolate the first and second reduced diameter lands. A first "o" ring support groove is provided at an upper end of the first reduced diameter land to circumferentially outwardly support a first "o" ring to prevent breach of vacuum in the first reduced diameter land at its upper end. A second, central "o" ring support groove is positioned between the first and second reduced diameter lands to circumferentially outwardly support a second "o" ring that isolates vacuum of the first and second reduced diameter lands with respect to each other. A third "o" ring support groove is provided at a lower end of the second reduced diameter land to circumferentially outwardly support a third "o" ring to prevent breach of vacuum in the second reduced diameter land at its lower end.

An outer fitting pivoting support sleeve has an internal surface that engages the first, second and third "o" rings simultaneously and provides an outer boundary for the space of the first and second vacuum transmission grooves at their respective reduced diameter grooves. The outer fitting pivoting support sleeve can pivot with respect to the segmented core. The outer fitting pivoting support sleeve supports a first threaded fitting bore at a level of the first reduced diameter land for threaded attachment of a first fitting. The outer fitting pivoting support sleeve supports a second threaded fitting bore at a level of the second reduced diameter land for threaded attachment of a second fitting. The outer fitting pivoting support sleeve pivots by manual turning of the outer fitting, perhaps with some assisted manual engagement of the first and second pneumatic quick disconnect fittings that, are threadably engaged to the outer fitting pivoting support sleeve.

A bottom of the segmented core includes an axially directed "o" ring support to provide support for an "o" ring for sealing the segmented core against a surface. The lower extent of the segmented core extends a short distance, perhaps 50 or 60 one-thousandths of an inch beyond the outer fitting pivoting support sleeve to insure that the outer fitting pivoting support sleeve will clear any surface to which the bottom end of the segmented core is attached. A top of the segmented core carries a set of threads for engagement with a spacer that can be supplied in varying heights. The top of the spacer has an axially directed "o" ring support to provide support for an "o" ring for sealing the spacer of the segmented core against a surface.

The spacer of varying heights is available to facilitate use with different height vacuum support. The use of the spacer to accommodate different heights between a lower vacuum plate and an upper vacuum support will enable a single axial length size of segmented core and a single axial length size of outer fitting pivoting support sleeve to be used with many different lengths of vacuum posts and many sizes of vacuum supports. This can be done with only the spacer being needed to be provided in different heights.

Easy manual pivoting of the circumferential direction of, the pneumatic vacuum fittings on the outer fitting pivoting support sleeve will enable a almost inadvertent adjustment to be made during setup. Adjustment is expected to be made to re-orient the pneumatic vacuum fittings to avoid interference with other structures and especially other vacuum fittings, when vacuum supports are positioned. Another slight adjustment is expected to be made to enable the use of the shorter, rather than longer, pneumatic vacuum hose. The pneumatic vacuum hoses can be more readily arranged for the most direct paths and in the simplest visual configurations to help minimize error, promote clear visualization during setup, and avoid conflict with other vacuum hoses exiting other vacuum posts placed adjacently.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
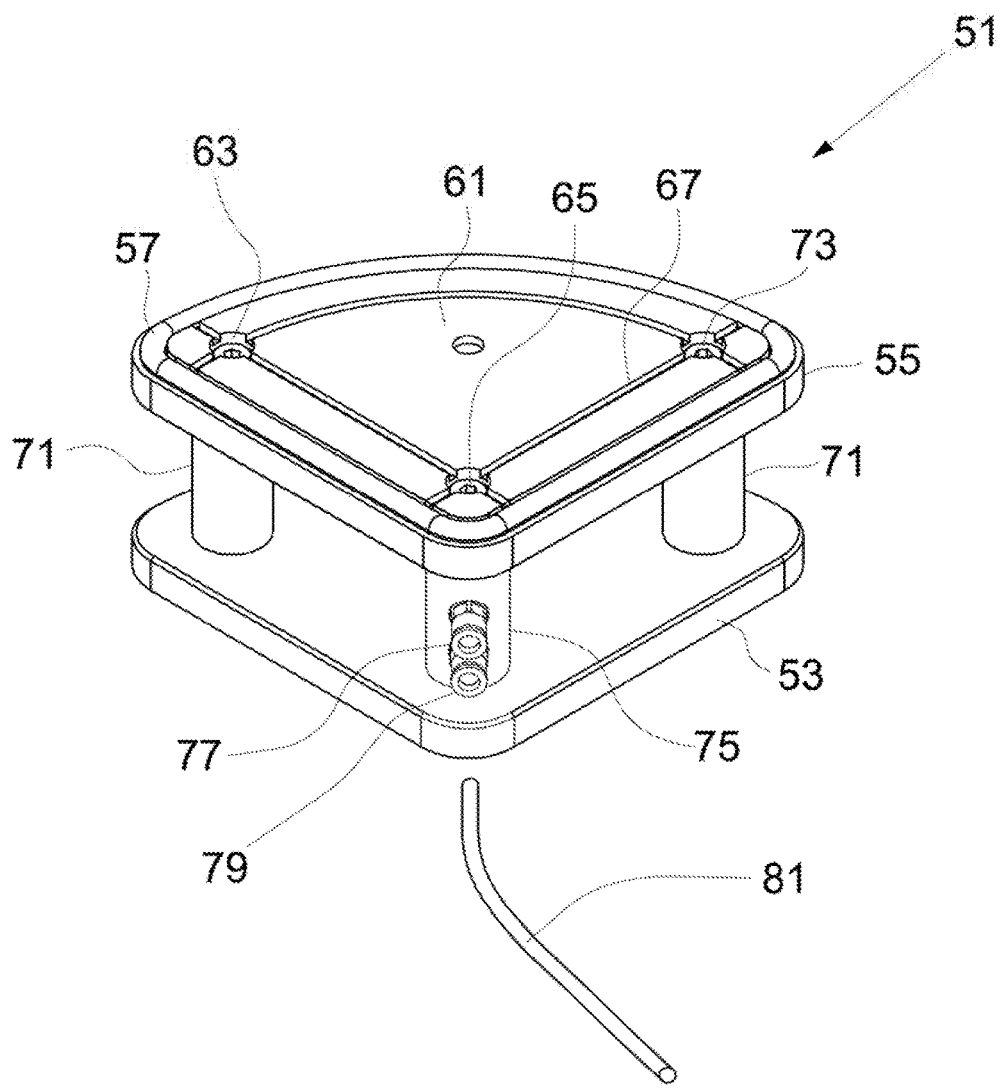
FIG. 1 is a perspective view looking downward onto a fixed direction vacuum support having a conventional fixed vacuum fitting support integral with a non-pivoting vacuum post and, illustrating pneumatic vacuum fittings located at an inside corner of a vacuum support having a radiused section shape and typically directed away from a middle of the vacuum support.

Referring to FIG. 1, a perspective view looking downward onto a vacuum support 51 is seen. Vacuum support 51 has a radiused section shape and is used for illustration only. At the bottom of FIG. 1 a vacuum base plate 5 is typically a metal plate with an underside vacuum seal (not seen in FIG. 1). An upper containment plate 55 may include a space for support of a peripheral seal 57 surrounding a dressed polymer 61 bondably mounted on a thin aluminum plate 63. A portion of thin aluminum plate 63 is seen adjacent a vacuum transmission screw 65. Vacuum transmission screw has a channel through its body to transmit vacuum from ore end to the other. A vacuum transmission groove 67 is shown in alignment with the area surrounding the vacuum transmission screw 65. Vacuum transmission groove 67 helps better distribute an applied vacuum across the area of the dressed polymer 61.

A pair of non-vacuum support posts 71 underlie and secure upper containment plate 55 each using a screw 73. Screws 73 are preferably not modified for vacuum transmission like the vacuum transmission screws 65 since simple support posts 71 are not involved in vacuum transmission. A conventional non-pivoting vacuum post 75 underlies and also secures upper containment plate 55 with a vacuum transmission screw 65. Vacuum post 75 is a fixed vacuum distribution post structure that independently supplies vacuum to the bottom of the vacuum base plate 53 and to the top of the upper containment plate 55. An independent and isolated upper pneumatic vacuum fitting 77 ands an independent and isolated lower pneumatic vacuum fitting 79 are horizontally supported by the conventional non-pivoting vacuum post 75.

The directional orientation of the pneumatic vacuum fittings 75 and 77 in the horizontal plane is usually fixed to a direction which is expected to be the most convenient, all other things being equal. The most distal ends of the pneumatic vacuum fittings 75 and 77, depending upon the particulars of construction may or may not extend beyond the outermost periphery of the overlie the vacuum base plate 53, but can nevertheless be subject to damage if the conventional vacuum support 51 is roughly handled. In addition, and for example, close placement of the conventional vacuum support 51 to another conventional vacuum support 51 could block the connection approach to the distal ends of the pneumatic vacuum fittings 77 and 79. A single pneumatic vacuum supply tube 81 is shown approaching the pneumatic vacuum fittings 77 and 79. The vacuum supply tube 81 used for vacuum connection are typically not amenable to sharp bending or sharp turns and can't be deployed where vacuum fittings 77 and 79 conflict or are restricted by another structure.

Figure 2:
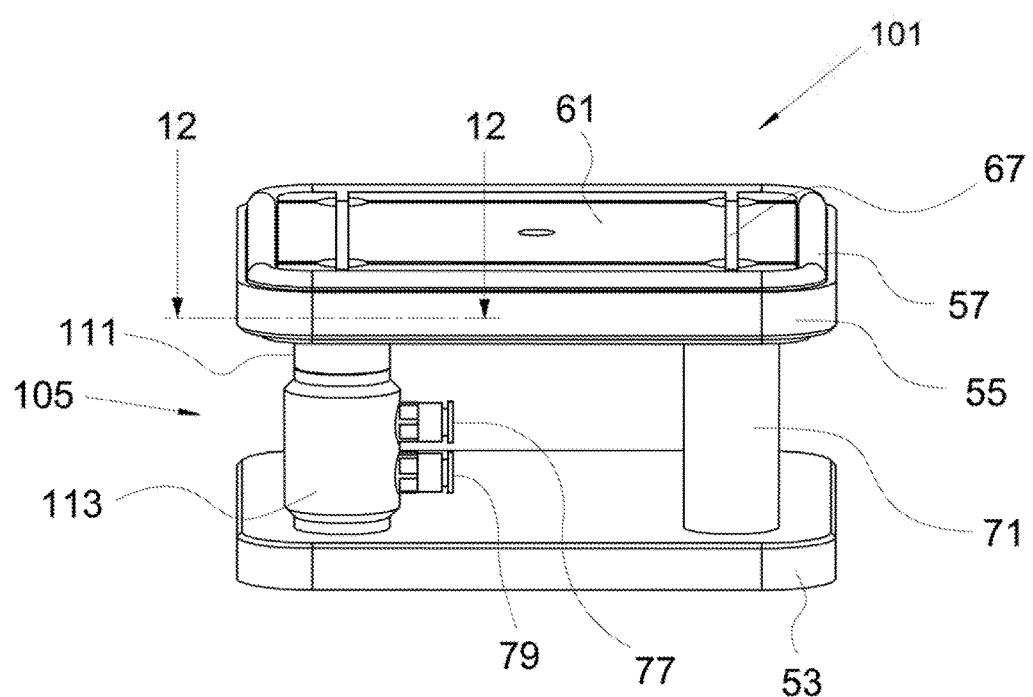
FIG. 2 is a perspective view looking downward onto a rectangular vacuum support employing the vacuum swivel post of the invention that enables the pneumatic vacuum quick fittings to be angularly directed with respect to the vacuum swivel post at a horizontal position at any direction within a horizontal plane.

Referring to FIG. 2, a perspective view looking downward onto a vacuum support 101 employing a vacuum swivel post 105 is shown. The components of vacuum swivel post 105 visible in FIG. 2 include an upper spacer 111 that overlies an outer fitting pivoting support sleeve 113. The outer fitting pivoting support sleeve 113 supports threadably attached, conventional, pneumatic vacuum fittings 77 and 79. All components other than the vacuum swivel post 105 seen in FIG. 2 are generally the same as was seen in FIG. 1 and are labeled using the same numbers.

Figure 3:
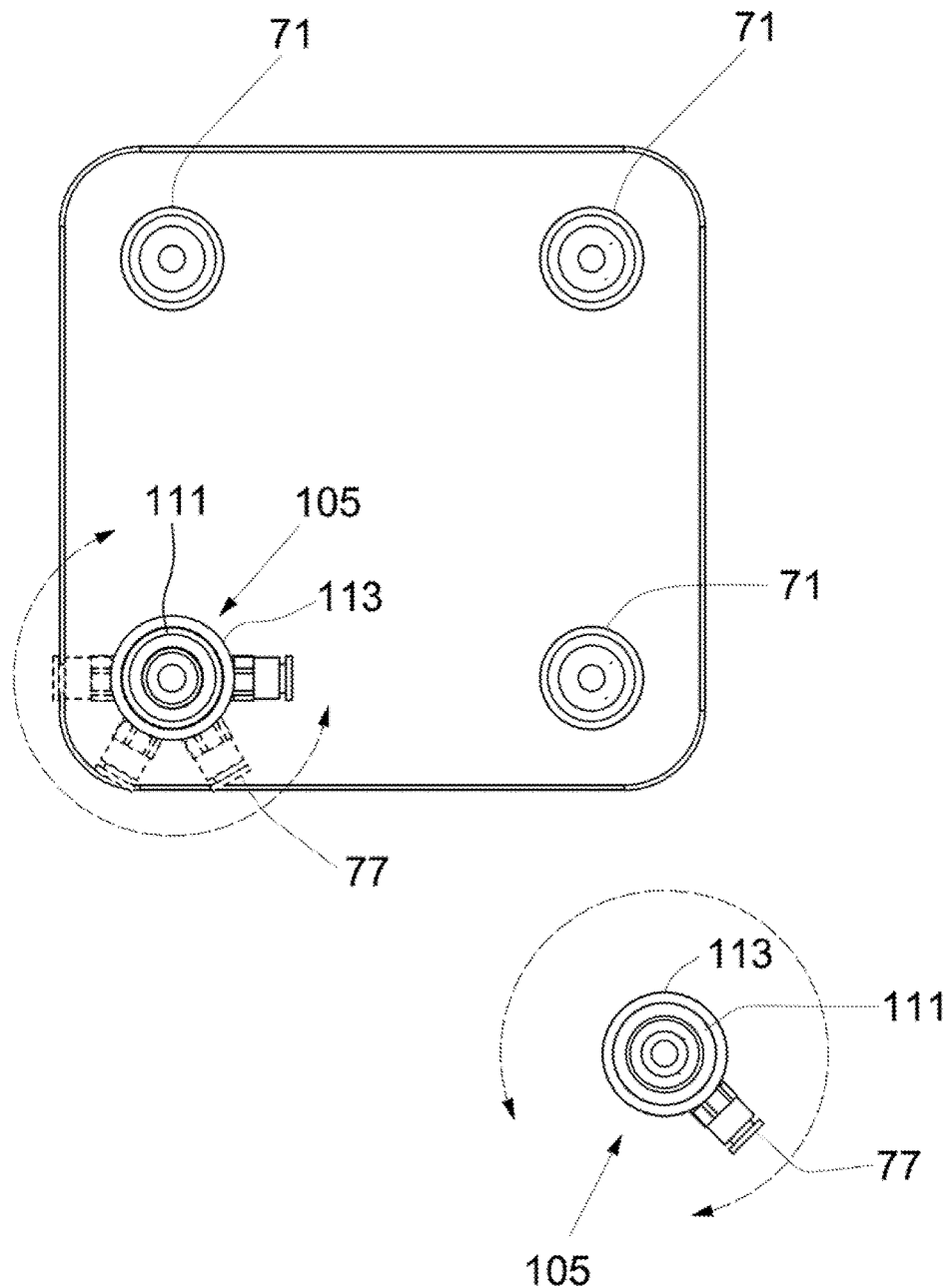
FIG. 3 is a top view looking downward onto the rectangular vacuum support of FIG. 2 with the upper containment plate removed to illustrate the wide variety of the many pivot positions of the vacuum swivel post shown in FIG. 2, as well as graphical illustration of the capability for full pivot greater than 360°.

Referring to FIG. 3, an elevation view of the vacuum swivel post 105 of FIG. 2 is shown in isolation. The outer fitting pivoting support sleeve 113 symmetrical about its axis such that a line drawn between the connection of the pneumatic vacuum fittings 77 and 79 would result in bilateral symmetry. On the outer fitting pivoting support sleeve 113, a main cylindrical surface 115 transitions to a brief conical section 117 before a transition to a brief terminal circumferentially smaller cylindrical surface 119, at both the upper and lower ends of outer fitting pivoting support sleeve 113. At the lowermost part of vacuum swivel post 105, below the lower brief terminal circumferentially smaller cylindrical surface 119, is seen a vary abbreviated lower portion of a segmented core 125. Segmented core 125 extends slightly below the lowermost extent of vacuum swivel post 105 to insure that will not contact any structure to which the segmented core 125 is attached.

Referring to FIG. 3, a top view looking downward onto the vacuum base plate 53 of vacuum support 101 having vacuum swivel post 105 illustrates a typical area of approach to the vacuum swivel post 105. The approach of a vacuum source tube (not shown in FIG. 3) can include a path over the base plate 53, to one side of, or in between posts 71, or across an edge of the base plate 53 near an edge of the base plate 53. A worker can simply urge the outer fitting pivoting support sleeve 113 in one direction or another to any extent to change the path of approach. A breakout view of the vacuum swivel post 105 with a circular arrow is illustrative of the fact that a wide variety of the many pivot positions can be achieved. In the embodiment shown a graphical illustration of the capability for full pivot greater than 360° is emphasized.

Figure 4:
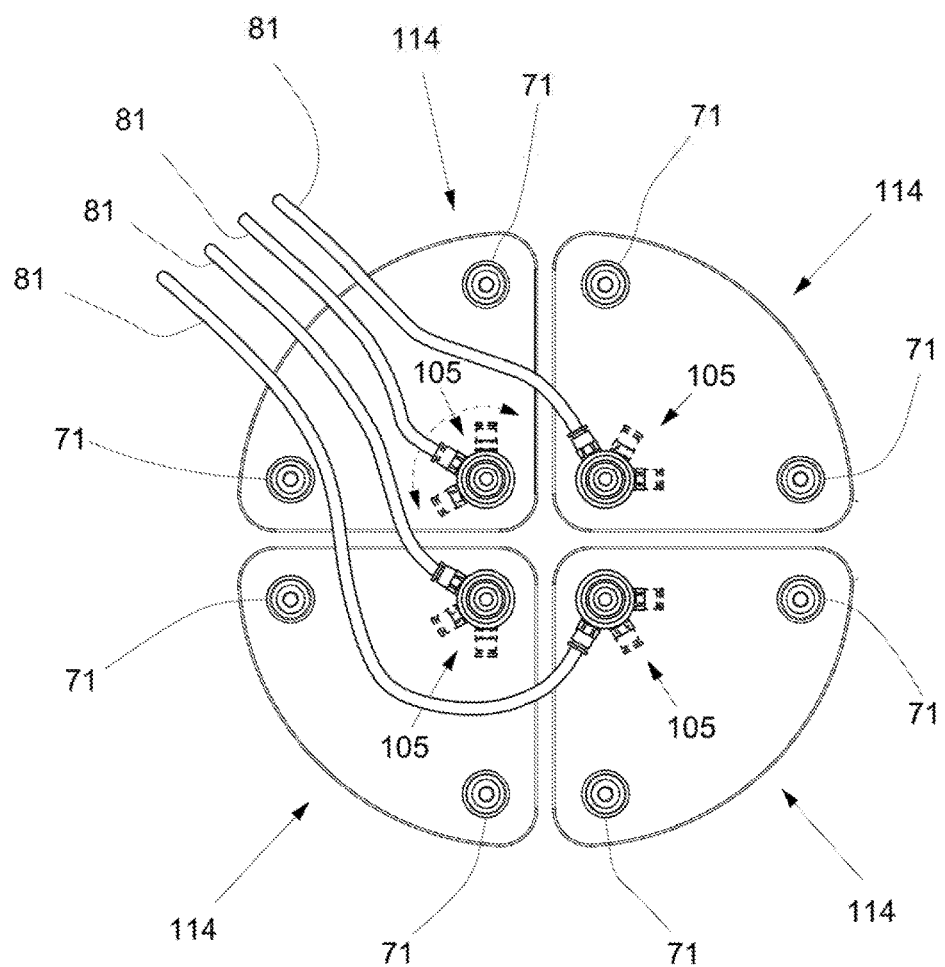
FIG. 4 is a top view looking downward onto four radiused section shape vacuum supports arranged for circular support; and illustrating the vacuum swivel post shown in FIGS. 2 and 3 having a pivoting capability such that the pivot fitting can be oriented predominantly in the direction from which vacuum source tubing extends.

Referring to FIG. 4, a top view looking downward onto four radiused vacuum supports 114 equipped with the vacuum swivel post 105 of FIGS. 2-3 is shown. The arrangement for a small circular support requires the four corners where the vacuum swivel posts 105 are located to be brought into close proximity to each other. The freedom for the vacuum swivel posts 105 to assume a different orientation as seen in FIG. 4 enables such close and non-interfering arrangements.

Were four of the vacuum support 51 with fixed angle pneumatic vacuum fittings 77 and 79 to be brought together in a similar configuration, opposing pairs of vacuum fittings 77 and 79 would block vacuum supply tube 81 at a common level. Without flexibility and ease of use of the vacuum swivel post 105 seen in FIG. 4, the circular shape would have to be disrupted and the support they would otherwise be capable of providing would be compromised.

The multi positions of the vacuum fittings 77 [and 79] are shown to show the wide variety of connection approaches possible. Possible connection approaches suggest the potential for different paths of approach of the vacuum supply tubes 81. In the example of FIG. 4 the vacuum supply tube 81 extend predominantly from one direction. The possible pivot angles suggest that approaches of vacuum supply tubes 81 from different directions are easily possible.

Figure 5:
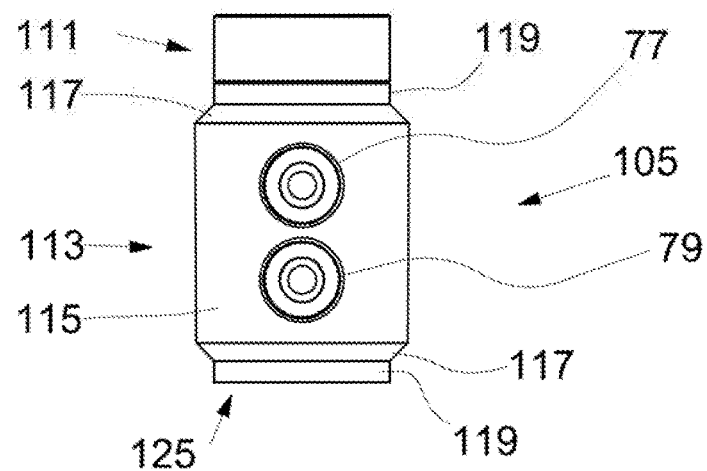
FIG. 5 is an elevation view of the vacuum swivel post of FIGS. 2-4 with the outer fitting pivoting support sleeve positioned to direct the pneumatic vacuum fittings in a direction toward the observer.

Referring to FIG. 5, an elevation view of the vacuum swivel post 105 of FIGS. 2-4 is shown in isolation. The outer fitting pivoting support sleeve 113 symmetrical about its axis such that a line drawn between the connection of the pneumatic vacuum fittings and 79 would result in bilateral symmetry. On the outer fitting pivoting support sleeve 113, a main cylindrical surface 115 transitions to a brief conical section 117 before a transition to a brief terminal circumferentially smaller cylindrical surface 119, at both the upper and lower ends of outer fitting pivoting support sleeve 113. At the lowermost part of vacuum swivel post 105, below the lower brief terminal circumferentially smaller cylindrical surface 119, is seen a very abbreviated lower portion of a segmented core 125. Segmented core 125 extends slightly below the lowermost extent of vacuum swivel post 105 to insure that will not contact any structure to which the segmented core 125 is attached.

Figure 6:
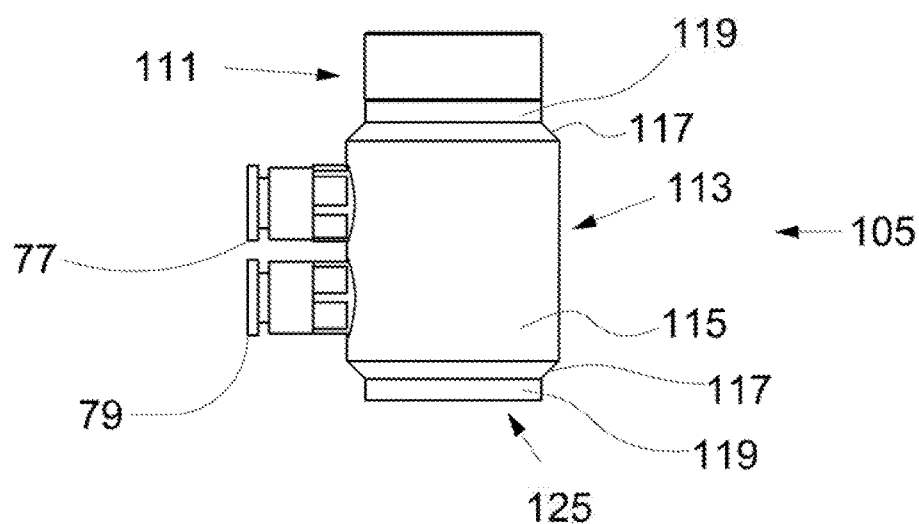
FIG. 6 is an elevation view of the vacuum swivel post of FIGS. 2-5 with the outer fitting pivoting support sleeve positioned to direct the pneumatic vacuum fittings directed to the left side.

Referring to FIG. 6, an elevation view of the vacuum swivel post 105 shown in FIGS. 2-5 is shown with the outer fitting pivoting support sleeve 113 positioned to direct the pneumatic vacuum fittings 77 and 79 to the left side of FIG. 6. The horizontal length of the supported pneumatic vacuum fittings 77 and 79 are an indicator that a greater ability to position them for protection is advantageous. Fixed direction pneumatic vacuum fittings 77 and 79 and a requirement for a more linear approach of vacuum supply lines might require greater lengths of vacuum supply lines on a working table (vacuum supply lines not shown). Put another way, the availability of use of the vacuum swivel post 105 will make it far less likely that an operator will need to compromise an optimum configuration of a working table arrangement of any type of vacuum support because of an otherwise awkward vacuum line approach.

Figure 7:
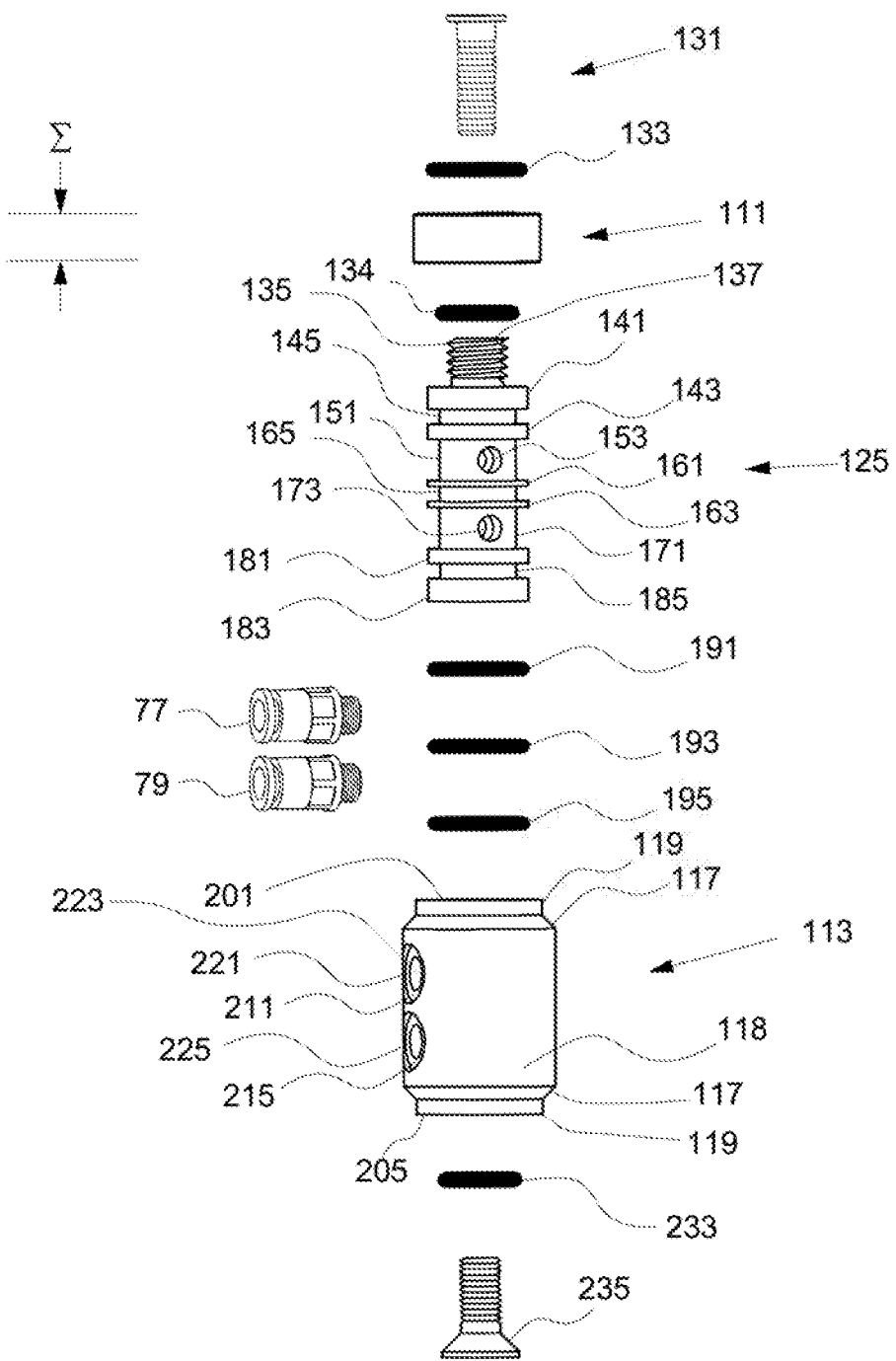
FIG. 7 is an exploded view of the vacuum swivel post of FIGS. 2-6 with circumferential and axial "o" rings and securing, fasteners illustrated.

Referring to FIG. 7, an exploded view of the vacuum swivel post 105 of FIGS. 2-6 is shown, including components to enable use of the vacuum swivel post 105 with a vacuum support 101. At the top of FIG. 7 is a vacuum transmission screw 131, which may be a low socket head screw. A small bore is typically formed that extends the length of the screw 131 (and which bore may include the socket) so that vacuum can be transmitted to the vacuum transmission groove 67 of vacuum support 101 so that vacuum will not be isolated to a limited area of the top of the dressed polymer 61.

Below the vacuum transmission screw 131, an upper, first axial "o" ring 133 is seen in a position just above the spacer 111. Spacer 111 has a support groove (not seen in FIG. 5) that enables first axial "o" ring 133 to seal against another surface, typically the underside of the upper containment plate 55. Spacer 111 will ideally be supplied in a variety axial heights "Σ" (sigma) which will be associated with the overall height of the vacuum swivel post 105 necessary to fit within a vacuum support 101 of a given height. The spacer 111 has been found to work well in heights of about 0.484 inches, 2.256 inches and 4.224 inches corresponding to overall vacuum support 101 weights of 105 millimeters, 150 millimeters, and 200 millimeters, respectively. These are merely popular vacuum support 101 heights. It is understood that spacer 111 could be eliminated by providing a longer segmented core 125 incorporating the sealing features of the spacer 111. The arrangement of a commonly used single segmented core 125 with various spacers reduces the duplication of the lore complex segmented core 125 part.

Below the spacer 111, a spacer-core "o" ring 134 is seen. The pacer-core "o" ring is compressed by a shallow groove (not seen in FIG. 7, but which will be seen in FIG. 8) in the underside of the spacer 111. Seen in FIG. 7 is the full length of, the segmented core 125 shown in plan view. At the top of the segmented core 125, an external spacer engagement thread 135 is carried on a boss 137. Boss 137 has an internal thread set (not yet shown) for engaging the screw 131. Below the external spacer engagement thread 135, the segmented core 125 is seen to have a series of lands formed by the cutting of square grooves of roughly even diameter to leave radial projections of a uniform size. A first land 141 is separated from a second land 143 to support a first, upper, circumferential "o" ring support groove 145. With these structures explained, it can be seen that the underside of the spacer 111 is in a position to force the spacer core "o" ring 134 into sealing compression against the top surface of the land 141 adjacent the external spacer engagement thread 135.

Below the second land 143, a first reduced diameter vacuum transmission groove 151 is located. First reduced diameter vacuum transmission groove 151 includes at least a first vacuum transmission aperture 153 into a space (not yet shown) within the segmented core 125 that communicates with an internal threaded bore inside the external spacer engagement thread 135 (also not yet shown). This arrangement is to enable vacuum from the pneumatic vacuum fitting 77 to be communicated through the outer fitting pivoting support sleeve 113 and into the first reduced diameter vacuum transmission groove 151, through to the vacuum transmission screw 131 to provide vacuum to the top of the vacuum support 101. First vacuum transmission aperture 153 may be a through bore and produce a pair of first vacuum transmission apertures 153 on both sides of the segmented core 125.

Below the first vacuum transmission aperture 153 a third land 161 is separated from a fourth land 163 to support a second, middle, circumferential "o" ring support groove 165. Circumferential "o" ring support groove 165, when fitted with appropriate sealing members, promotes the vacuum isolation of the first reduced diameter vacuum transmission groove 151 at its axially lower boundary. Likewise Circumferential "o" ring support groove 145, when fitted with appropriate sealing members, promotes the vacuum isolation of the first reduced diameter vacuum transmission groove 151 at its axially upper boundary.

Below the fourth land 163, a second reduced diameter vacuum transmission groove 171 is located. Second reduced diameter vacuum transmission groove 171 includes at least a second vacuum transmission aperture 173. Below the second vacuum transmission aperture 173 a fifth land 181 is separated from a sixth land 183 to support a third, lower, circumferential "o" ring support groove 185. Circumferential "o" ring support groove 185, when fitted with appropriate sealing members, promotes the vacuum isolation of the second reduced diameter vacuum transmission groove 171 at its axially lower boundary. Likewise Circumferential "o" ring support groove 155, when fitted with appropriate sealing members, promotes the vacuum isolation of the second reduced diameter vacuum transmission groove 171 at its axially upper boundary.

A series of three "o" rings 191, 193, & 195 are shown spaced apart axially below the segmented core 125. The pneumatic vacuum fittings 77 and 79 are shown in a position corresponding to the area between "o" rings 191 & 193, and between "o" rings 191 & 193, respectively. The positioning indicates that pneumatic vacuum fittings 77 and 79 supply vacuum separately to the areas between the "o" rings 191 & 193, and between the "o" rings 193 & 195, respectively. Thus the "o" ring support groove 165 and "o" ring 193 is responsible for providing a boundary of separation between the vacuum introduced the pneumatic vacuum fittings 77 and 79 so that they continue to operate independently of each other while being enabled to swivel.

Below the lowest "o" ring 195, the pivoting outer fitting pivoting support sleeve 113 is seen in isolation. An upper, first end 201 is more easily identified, as is a lower, second end 205. With the pneumatic vacuum fittings 77 and 79 removed, an upper, first countersunk flat groove 211 and a second countersunk flat groove 215 are visible. An upper threaded bore 221 extends from a position adjacent an inner part of the first countersunk flat groove 211 into an inner volume 223 of the outer fitting pivoting support, sleeve 113. A lower threaded bore 225 extends from a position adjacent an inner part of the second countersunk flat groove 215 into the same inner volume 223 of the outer fitting pivoting support sleeve 113. The first and second countersunk flat grooves 211 & 215 provide a flat surface for seating the pneumatic vacuum fittings 77 and 79.

Below the first end 205 of the outer fitting pi 4Y ting support sleeve 113, a lower, second axial "o" ring 233 is shown. Second axial "O" ring 233 fits within a groove (not shown in FIG. 7) of the lower end of the segmented core 125. The lower end of the segmented core 125 has a support groove (not seen) that enables second axial "o" ring 233 to seal against another surface. At the very bottom of FIG. 7 is a lower, vacuum transmission screw 235 which may be socket and angular chamfer head screw. As was the case for vacuum transmission screw 131, small bore is typically formed that extends the length of the screw 235 (and which bore may include its socket) so that vacuum can be transmitted through the vacuum base plate 53 to hold the vacuum support 101 having vacuum swivel post 105 down upon a working table (not shown). The components shown in FIG. 7 contemplate plate engagement structure below vacuum transmission screw 131 and above the vacuum transmission screw 235 for use, with various height vacuum supports 101.

Figure 8:
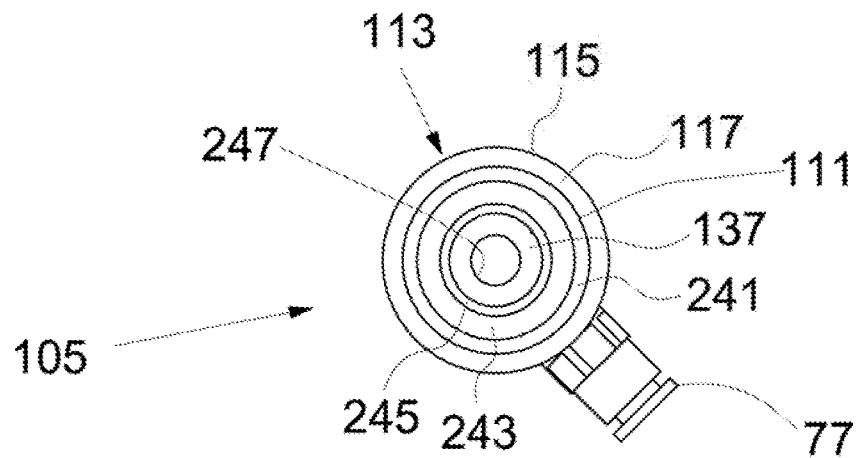
FIG. 8 is a top view of the isolated vacuum swivel post of FIGS. 3-7 and illustrates further details of the upper side of the spacer, its sealing support structures and the segmented core to which it is attached.

Referring to FIG. 8, a top view of the isolated vacuum swivel post 105 of FIGS. 2-7 illustrates further details of the upper side of the spacer 111 and the segmented core 125. From the outside and proceeding inward, main, cylindrical surface 115 is adjacent the brief conical section 117 of the outer fitting pivoting support sleeve 113. The next structure seen is the space 111. The outside of the spacer 111 is adjacent an outer wall 241. Outer wall 241 is adjacent an axially directed "o" ring slot 243. An inner wall 245 completes the inner support for complete formation of the axially directed "o" ring slot 243.

Figure 9:
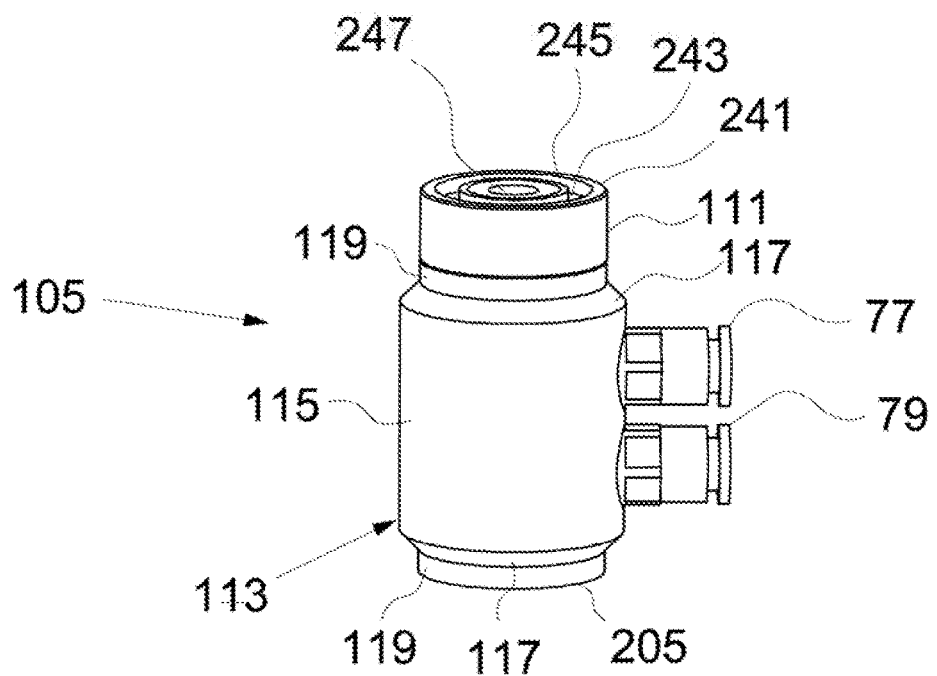
FIG. 9 is an upper perspective of the isolated vacuum swivel post of FIGS. 2-8 and showing some depth of arrangement of the engagement and sealing support structures.

The inner wall 245 has an inside threaded set, not well seen in FIG. 6, that engages the external spacer engagement thread 135 of the boss 137. Boss 137 is seen to lie concentrically inwardly of the inner wall 245. However, as will be shown more directly, boss 137 carries an internal threaded bore 247 for engaging the vacuum transmission screw 131. Referring to FIG. 9, the structures of FIG. 8 can be seen in perspective. The perspective angle of view does not enable the segmented core 125 to be seen in FIG. 9.

Figure 10:
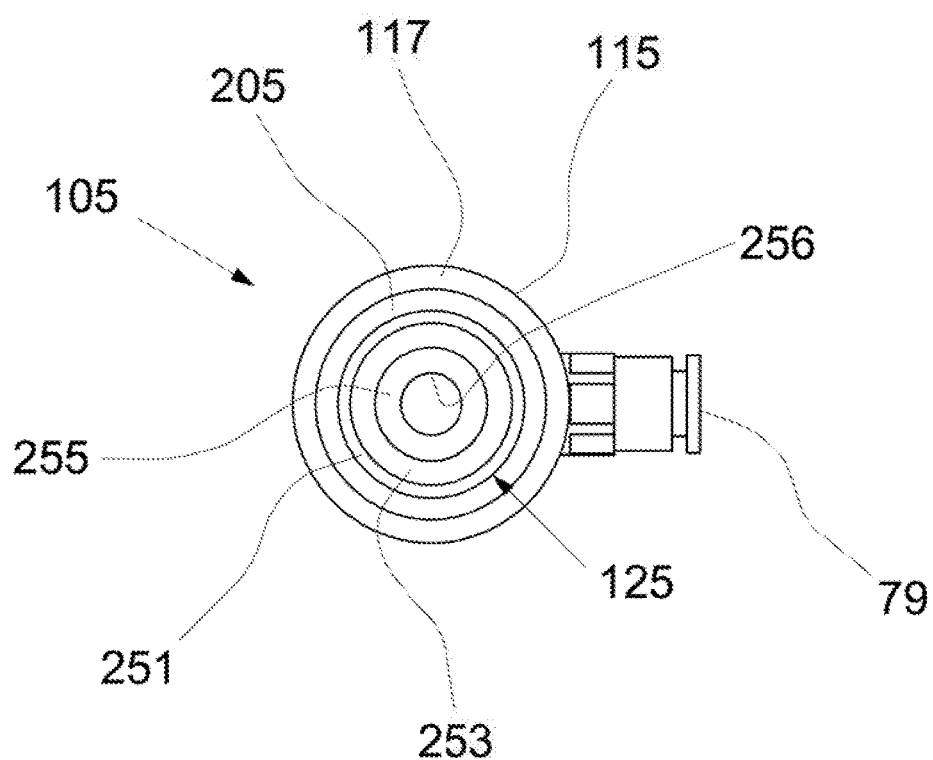
FIG. 10 is a bottom view of the isolated vacuum swivel post of FIGS. 3-9 and illustrating the arrangement of, the engagement and sealing support structures.

Referring to FIG. 10, a bottom view of the isolated vacuum swivel post 105 of FIGS. 3-9 illustrates further details of the lower end of the lower portion of a segmented core 125. From the outside and proceeding inward, main cylindrical surface 115 is adjacent the brief conical section 117, both of the outer fitting pivoting support sleeve 113. Because no structure overlies the lower, second end 205 of outer fitting support sleeve 113, it is the next structure seen. Further inwardly, the next structure seen is at the bottom end of the segmented core 125. Segmented core 125 includes an outer wall 251 which is immediately adjacent sixth land 183 seen in FIG. 5. Outer wall 251 is adjacent an axially directed "o" ring slot 253. An inner wall 255 completes the lateral support for complete formation of the axially directed "o" ring slot 253. Concentrically inwardly of the inner wall 255 a threaded bore 257 is seen. Threaded bore 257 is for engaging lower, vacuum transmission screw 235 that was seen in FIG. 7.

Figure 11:
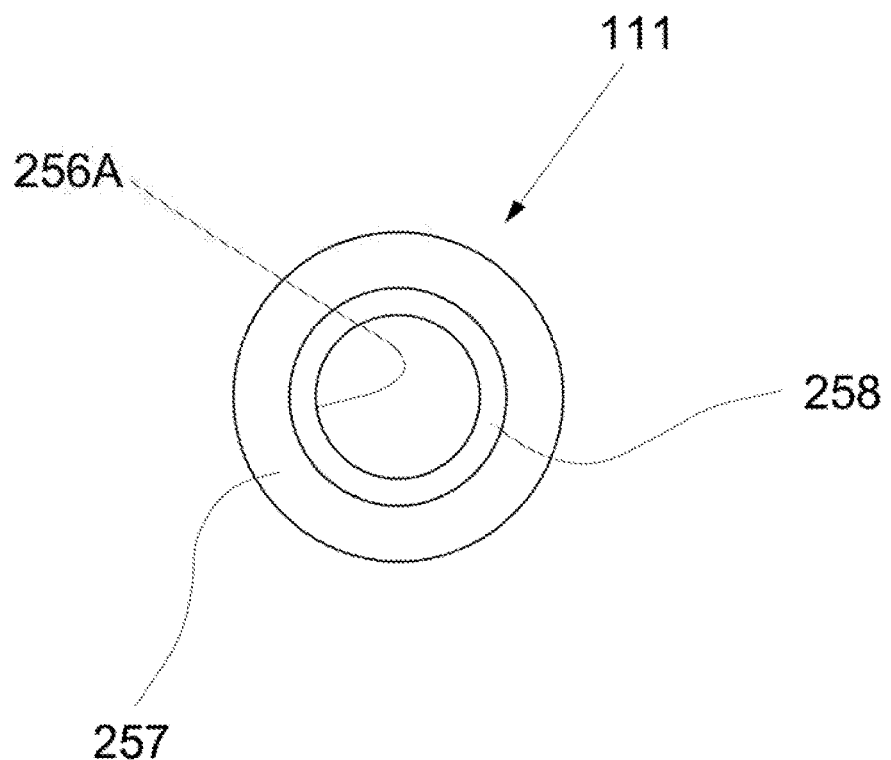
FIG. 11 is a bottom view of the spacer shown with the vacuum swivel post of FIGS. 2-10 and illustrating a groove concentrically within an outer located flat surface 257.

Referring to FIG. 11, a bottom view of the spacer 111 is seen. At the innermost extent of the spacer 111 a segmented core boss engagement thread 256A is provided for enbabement with the external spacer engagement thread 135 of the segmented core 125. Spacer 111 has a concentrically outer located flat surface 257. A groove 258 is located concentrically inwardly of the flat surface 257. Groove 258 has a diameter and depth to enable the spacer-core "o" ring 134 to be sealably compressed by spacer 111 against the first land 141 of segmented core 125.

Figure 12:
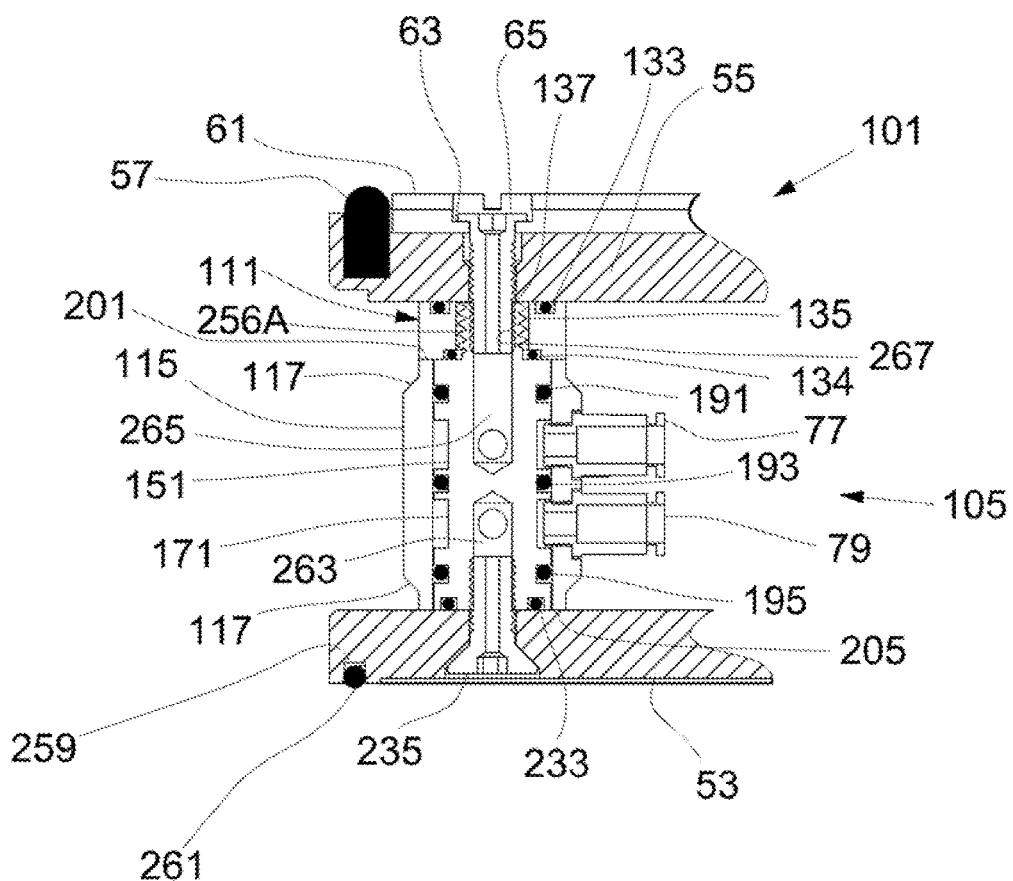
FIG. 12 is a sectional view of the vacuum swivel post of FIGS. 2-11 taken along line 12-12 of FIG. 2 to illustrate the segmented core engagement to the upper structures of the vacuum support through the spacer and to it the segmented core engagement to the vacuum base plate.

Referring to FIG. 12, a sectional view of the vacuum swivel post 105 of FIGS. 3-11 taken along line 12-12 of FIG. 2 is shown. As can be seen vacuum base plate 53 may generally be a generally solid plate, and is preferably fitted with a groove 259 having an seal 261, also shown in section. The lower vacuum transmission screw 235 clears the bottom surface of the vacuum base plate 53 so that first contact of the vacuum base plate 53 will be the seal 233. A lower space 263 is in fluid communication between the vacuum transmission screw 235 and the lower pneumatic vacuum fitting 79 via the lower threaded bore 225 seen in FIG. 7. Likewise, An upper space 265 is in fluid communication between the vacuum transmission screw 65 and the upper pneumatic vacuum fitting 77 via the upper threaded bore 221 seen in FIG. 7. Note that first and second reduced diameter vacuum transmission groove 151 and 171 can, depending upon the dimensions of the materials used, provide some clearance for the innermost extent of pneumatic vacuum fittings 77 and 79. The radial vacuum availability transmission space provided by first and second reduced diameter vacuum transmission groove 151 and 171 which oppose the straight cylindrical inside of the outer fitting pivoting support sleeve 113 could be provided by other structures. A radial vacuum availability transmission space could be provided by an inwardly directed groove in an intermedate structure or directly into the cylindrical inside of the outer fitting pivoting support sleeve 113.

At the top of FIG. 12, the component parts of upper horizontal structure of the vacuum support 101 are seen. The upper containment plate 55 supports the thin aluminum plate 63 to which is bonded the dressed polymer 61. The vacuum transmission screw 65 can be seen holding the aluminum plate 63 to the upper containment plate 55 by engagement with a thread 267 on the inside of the boss 137. The spacer 111 internal segmented core boss engagement thread 256A is shown to engage the external spacer engagement thread 135, especially where a spacer 111 is of a shorter height to enable the internal thread 269 of the boss 137 to be directly accessed by a vacuum transmission screw 65. Thus in the configuration of FIG. 12, the component parts supported by the upper containment plate 55 are held directly by the upper structure of the segmented core 125. The spacer 111 is also held directly by the upper structure of the segmented core 125, namely the external spacer engagement thread 135.

Figure 13:
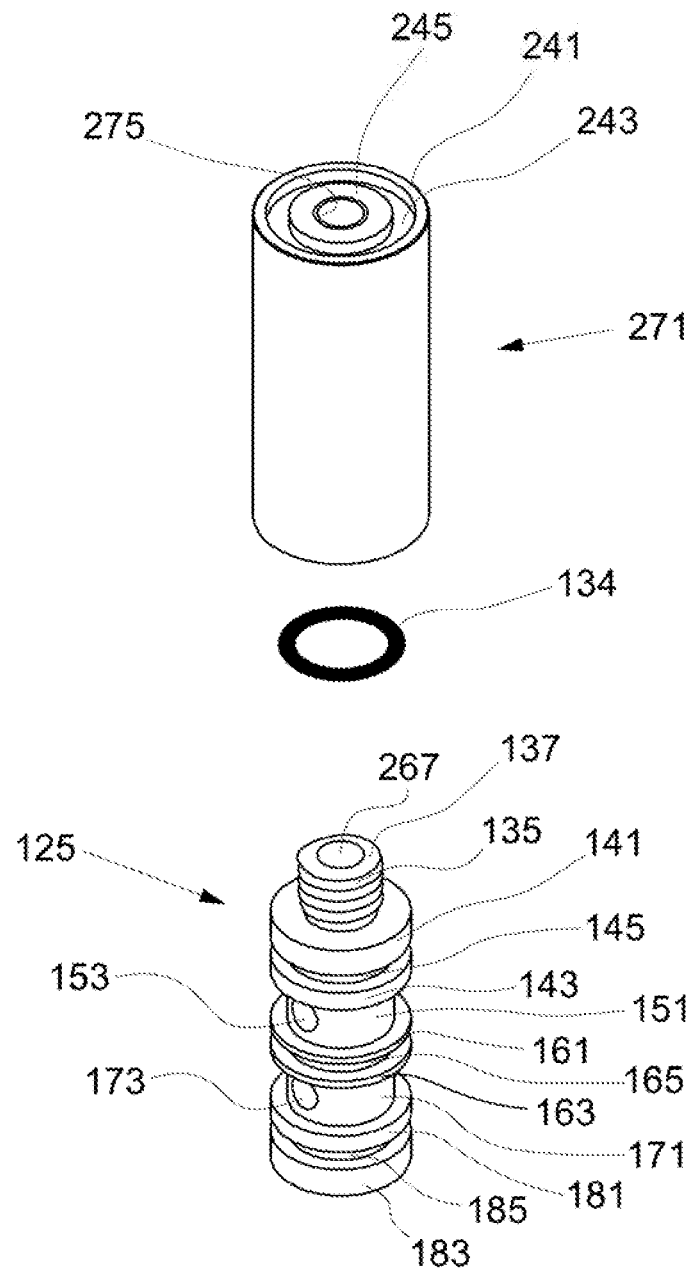
FIG. 13 is an upper perspective view of the vacuum swivel post of FIGS. 2-12, but having a longer spacer shown above the segmented core 125 which will engage it at its lower end.

Referring to FIG. 13, an upper perspective view of a longer spacer 271 is shown above the segmented core 125. The outer fitting pivoting support sleeve 113 is not shown in order to obtain some better observation of the structures of the segmented core 125. Structures common to the top of the spacer 111 are seen atop longer spacer 271. Axially longer spacer 271, includes a circular groove 243 for supporting the upper axial "o" ring 133 seen in FIG. 5. The circular groove 243 is bound by the concentrically larger outer wall 245 and the concentrically smaller inner wall 247.

However, longer spacer 271 has a threaded bore 275 at its upper end sized to accept threaded engagement by the vacuum transmission screw 65 directly into longer spacer 271. Due to the length of the longer spacer 271 the internal threaded bore 247 inside of the boss 137 that was previously directly engaged by vacuum transmission screw 65 will not be used. The threaded bore 275 of the longer spacer 271 will engage the same vacuum transmission screw 65.

A lower end of the longer spacer 271 matches the bottom details seen for the of the spacer 111 shown in FIG. 9. In addition, the internal segmented core boss engagement thread 256A is not seen in FIG. 13 but will be shown in detail in FIG. 14. Thus, the longer spacer 271 will attach to the segmented core 125 by attachment using external spacer engagement thread 135 on boss 137 to capture the spacer-core "o" ring 134. Spacer-core "o" ring 134 provides sealing between the longer spacer 271 and segmented core 125. An internal threaded bore 256A will be used in the spacer to engage with the spacer engagement thread 135 on boss 137, as will be shown in FIG. 14.

Figure 14:
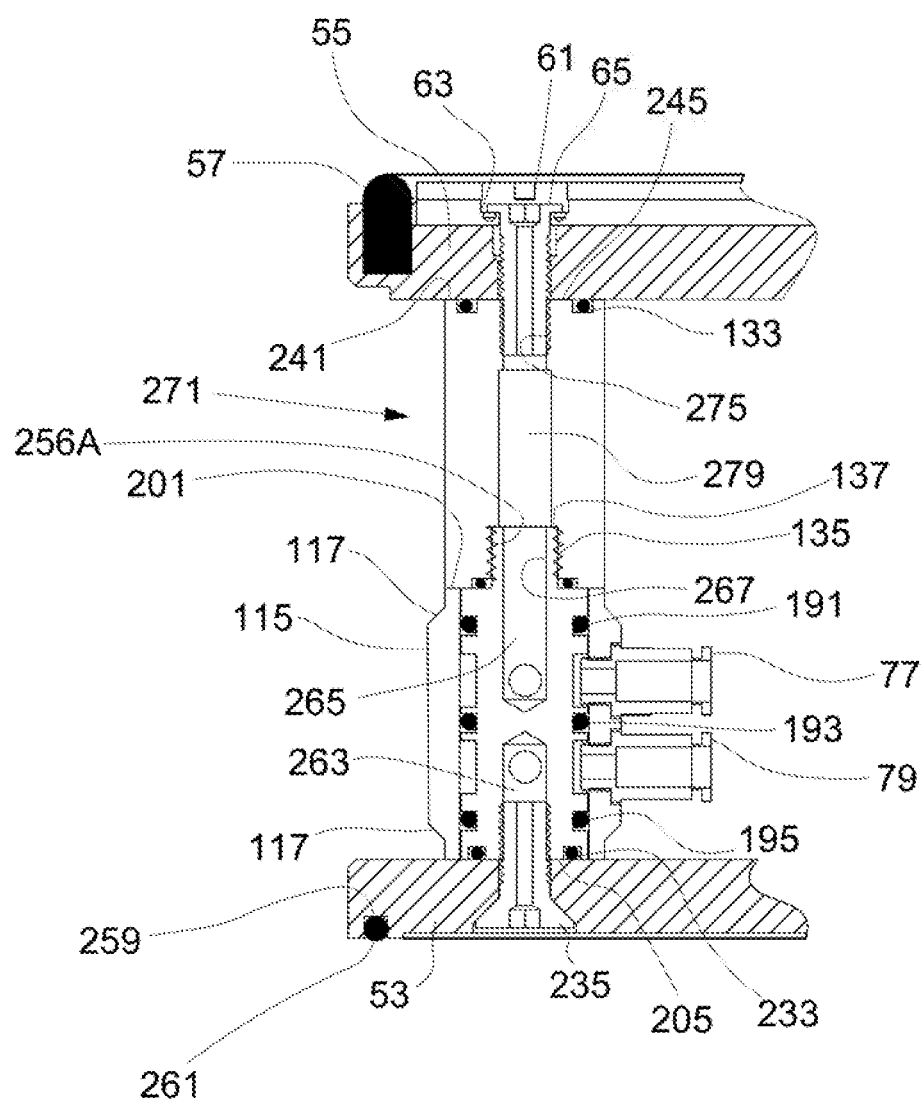
FIG. 14 is a sectional view of the vacuum swivel post of FIGS. 2-13 and with a longer spacer seen in FIG. 13 in a sectional view similar to the view of FIG. 12, and illustrating details of the segmented core engagement to the spacer and the spacer's engagement with the upper structures of the vacuum support of FIG. 2.

Referring to FIG. 14, a sectional view of the vacuum swivel post 105 with a longer spacer 271 is shown and is similar to the view of FIG. 12. In the case of an axially taller adapter 271 the upper vacuum transmission screw 65 is in fluid communication with the upper space 265 via the inside of the boss 137, and an internal connection bore 279. The length of the internal connection bore 279 will change proportionately with the length of the longer spacer 271. In addition, the internal segmented core boss engagement thread 256A is shown as securing longer spacer 271 to the external spacer engagement thread 135 of the segmented core 125.

While the present invention has been described in terms of a system for enabling angular directional pivoting adjustment for two different pneumatic vacuum fittings on a post support structure, while maintaining separate control, the structures techniques employed herein are applicable to a wide range of devices, machines, and methods to provide easily producible, assemblable and constructable components. Although the invention has been derived with reference to particular illustrative embodiments thereof, many changes and modifications of the invention may become apparent to those skilled in the art without departing from the spirit and scope of the invention. Therefore, included within the patent warranted are all such changes and modifications as may reasonably and properly be included within the scope of this contribution to the art.

What is claimed:

1. A pivoting swivel post for a vacuum support to enable upper and lower vacuum distribution comprising:

an outer fitting pivoting support sleeve for supporting and sealably engaging a first pneumatic vacuum fitting and a second pneumatic vacuum fitting;

segmented core assembly having a first end for abutting against a first surface and externally sealing and a second end for abutting against a second surface and externally sealing, a first vacuum transmission space in fluid communication with the first pneumatic vacuum fitting, and a second vacuum transmission space in fluid communication with the second pneumatic vacuum fitting, the outer fitting pivoting support fitted onto the segmented core to seal the first vacuum transmission space from the second vacuum transmission space, the segmented core having a first internal space in fluid communication between the first vacuum transmission space and the first end of the segmented core, and having a second internal space in fluid communication between the second vacuum transmission space and the second end of the segmented core, to enable the first pneumatic vacuum fitting to transmit vacuum to the first end of the segmented core and to enable the second pneumatic vacuum fitting to transmit vacuum to the second end of the segmented core regardless of a position of pivot of the outer fitting pivoting support sleeve with respect to the segmented core wherein the segmented core assembly includes a boss having an external spacer engagement thread, the segmented core further comprising a spacer having an internal segmented core boss engagement thread for engaging the external spacer engagement thread of the segmented core, and wherein the spacer includes the sealing structure to facilitate abutting against a second surface and externally sealing against another surface.

2. The pivoting swivel post for a vacuum support as recited in claim 1 where the segmented core assembly has a first end and a second end each having an internal threaded bore for engaging at least one of an upper containment plate and a vacuum base plate.

3. The pivoting swivel post for a vacuum support as recited in claim 2 wherein the spacer includes an internal threaded bore for engaging at least one of an upper containment plate and a vacuum base plate.

4. The pivoting swivel post for a vacuum support as recited in claim 1 wherein the spacer includes an internal threaded bore for engaging at least one of an upper containment plate and a vacuum base plate.

5. The pivoting swivel post for a vacuum support as recited in claim 4 wherein the spacer includes an "o" ring support groove for supporting an axial "o" ring and around the internal threaded bore for engaging at least one of an upper containment plate and a vacuum base plate, to facilitate sealing engagement of at least one of an upper containment plate and a vacuum base plate.

6. The pivoting swivel post for a vacuum support as recited in claim 1 wherein the first and second ends of the segmented core for abutting against a first surface and externally sealing each include an "o" ring support groove for supporting an axial "o" ring to facilitate sealing engagement of at least one of an upper containment plate and a vacuum base plate.

7. The pivoting swivel post for a vacuum support as recited in claim 1 wherein the first and second ends of the segmented core for abutting against a first surface and externally sealing each include an "o" ring support groove for supporting an axial "o" ring to facilitate sealing engagement of at least one of an upper containment plate and a vacuum base plate.

\* \* \* \* \*